United States Patent
Pfitzner (10) Patent No.: US 9,684,717 B2
(45) Date of Patent: Jun. 20, 2017

(54) SEMANTIC SEARCH FOR BUSINESS ENTITIES

(75) Inventor: Ingo Pfitzner, Berlin (DE)

(73) Assignee: SAP SE, Walldorf (DE)

( * ) Notice: Subject to any disclaimer, the term of this patent is extended or adjusted under 35 U.S.C. 154(b) by 532 days.

(21) Appl. No.: 13/526,114

(22) Filed: Jun. 18, 2012

(65) Prior Publication Data

US 2013/0339340 A1  Dec. 19, 2013

(51) Int. Cl.
*G06F 17/30* (2006.01)

(52) U.S. Cl.
CPC .................. *G06F 17/30861* (2013.01)

(58) Field of Classification Search
CPC ................................ G06F 17/30734
USPC .................................. 707/713, 711
See application file for complete search history.

(56) References Cited

U.S. PATENT DOCUMENTS

| | | | |
|---|---|---|---|
| 7,349,929 B2 | 3/2008 | Pfitzner | |
| 7,426,543 B2 | 9/2008 | Pfitzner | |
| 7,506,069 B2 | 3/2009 | Pfitzner | |
| 7,966,566 B2 | 6/2011 | Ritter et al. | |
| 2004/0010491 A1* | 1/2004 | Riedinger | G06F 17/30507 |
| 2006/0036592 A1* | 2/2006 | Das | G06F 17/30418 |
| 2007/0174270 A1* | 7/2007 | Goodwin | G06F 17/30864 |
| 2008/0177994 A1* | 7/2008 | Mayer | G06F 9/4418 713/2 |
| 2008/0215542 A1* | 9/2008 | Lim | G06F 17/30734 |
| 2010/0036797 A1* | 2/2010 | Wong | G06F 17/3087 706/55 |
| 2010/0070324 A1 | 3/2010 | Bock et al. | |
| 2010/0070329 A1 | 3/2010 | Engler et al. | |
| 2010/0070336 A1 | 3/2010 | Koegler et al. | |
| 2010/0082497 A1 | 4/2010 | Biesemann et al. | |
| 2010/0287158 A1* | 11/2010 | Toledano | G06F 17/30463 707/718 |
| 2010/0306198 A1* | 12/2010 | Gadacz | G06Q 30/06 707/738 |
| 2010/0306249 A1* | 12/2010 | Hill | G06F 17/30867 707/769 |
| 2010/0318929 A1* | 12/2010 | Hilton | G06F 3/0486 715/769 |
| 2011/0004588 A1* | 1/2011 | Leitersdorf | G06F 17/30864 707/711 |
| 2011/0055221 A1* | 3/2011 | Sovio | G06F 17/30958 707/747 |
| 2011/0153639 A1* | 6/2011 | Christensen | G06F 17/30864 707/769 |

(Continued)

*Primary Examiner* — Noosha Arjomandi
(74) *Attorney, Agent, or Firm* — Fish & Richardson P.C.

(57) ABSTRACT

Systems and methods for using a semantic search to address business entities that fulfill certain criteria are provided. A free search term may be determined by a user for the semantic search. The free search term may include any object type, element or parameter the user would like to search for. An ontology which relates to a specific business or industry may be used for the semantic search. The ontology may include various business classes, roles, and individuals. In some implementations, the ontology may be generated from metadata of business objects. The semantic search may be conducted across the entire ontology to obtain search results that match the free search term. As a result, business entities that fulfill the free search term may be retrieved and provided to the user.

14 Claims, 6 Drawing Sheets

(56) References Cited

U.S. PATENT DOCUMENTS

| | | | |
|---|---|---|---|
| 2011/0179007 A1* | 7/2011 | Shi | G06F 17/3089 707/706 |
| 2011/0231385 A1* | 9/2011 | Wang | G06F 17/30864 707/709 |
| 2011/0314052 A1* | 12/2011 | Francis | G06F 17/30994 707/769 |
| 2012/0047079 A1 | 2/2012 | Biesemann et al. | |
| 2012/0215733 A1* | 8/2012 | Breiter | G06N 5/04 706/47 |
| 2012/0233188 A1* | 9/2012 | Majumdar | G06F 17/30569 707/756 |
| 2012/0246155 A1* | 9/2012 | Vadlamani | G06F 17/30707 707/728 |
| 2012/0246173 A1* | 9/2012 | Wittmer | G06F 17/30991 707/749 |
| 2012/0330948 A1* | 12/2012 | Rault | G06F 17/3087 707/728 |
| 2013/0339340 A1* | 12/2013 | Pfitzner | G06F 17/30861 707/713 |

\* cited by examiner

SEMANTIC SEARCH FOR BUSINESS ENTITIES

TECHNICAL FIELD

This disclosure relates to methods and systems for searching business entities, and more particularly, to searching business entities based on search terms that are freely determined by a user.

BACKGROUND

A user may be interested in information about business entities that meet one or more business criteria for various purposes. For example, a target group may need to be created in campaign management for addressing the accounts and contact person, according to certain selection criteria such as location, net value of the sales order, or number of total employees. A list of pre-defined search criteria may be provided to the user for the search of business entities, in which a group of specific object types, elements and parameters may be identified. Subsequently, the user is allowed to select search criteria using the pre-identified object types, elements and parameters. However, the user would not be able to conduct the search based on object types, elements or parameters that are not included or defined in the list of pre-defined search criteria. In other words, the user would not be allowed to make up any new criteria for the search, but only follow the pre-defined search criteria.

SUMMARY

The details of one or more implementations of the disclosure are set forth in the accompanying drawings and the description below. Other features, objects, and advantages of the disclosure will be apparent from the description and drawings, and from the claims.

Certain aspects of the disclosure are directed to system, methods, and computer program products tangibly embodied on non-transient computer readable media. A search request may be received from a user, the search request including a free search term about a business entity. A search using an ontology may be executed, the search based on the free search term and the ontology facilitating the search semantically. At least one search result associated with the free search term can be identified.

In certain implementations, the free search term can be freely determined by the user. Terminological components of the ontology can be generated, at least in part, from metadata of business objects. In certain aspects, the ontology includes classes, roles, and individuals. Individuals can be considered as instances, and roles considered as relations. In certain implementations, the search searches all classes, roles, and individuals of the ontology.

In certain implementations, the at least one search result associated with the free search term can be stored in a memory. The at least one search result can be replicated for at least one search received at a later time instance, subsequent to storing the at least one search result.

In certain implementations, the at least one search result associated with the free search term can be provided to the user.

In certain implementations, the search is executed based on Web Ontology Language (OWL) modeled data for semantic information retrieval.

In certain implementations, retrieving the at least one search result associated with the free search term includes assigning content to an assertion component of the ontology.

DESCRIPTION OF DRAWINGS

Like reference symbols in the various drawings indicate like elements.

DETAILED DESCRIPTION

The present disclosure pertains to systems, methods, and computer program products for conducting semantic searches for business entities. The business entities may include corporations, cooperatives, partnerships, limited liability companies, other specialized types of organizations, or any other business instances. Semantic searches allow users to use any elements across over different business objects as criteria for the search. Standard semantic search tools may be based on Web Ontology Language (OWL) modeled data, and used for semantic information retrieval. As such, the search criteria need not be pre-defined and the semantic search may be conducted over an entire ontology for the specific business to search for business entities that fulfill the search criteria. Ontologies can be used to present a knowledge base for a particular business or industry and to describe business concepts and relationships, such as business classes, roles, and individuals. In some implementations, the ontology may be generated from metadata of business objects. Semantic searches using the appropriate ontology would provide the user flexibility in terms of search criteria, as well as improve the relevancy of search results by taking account of user context, synonyms, homonyms, etc.

Figure 1:
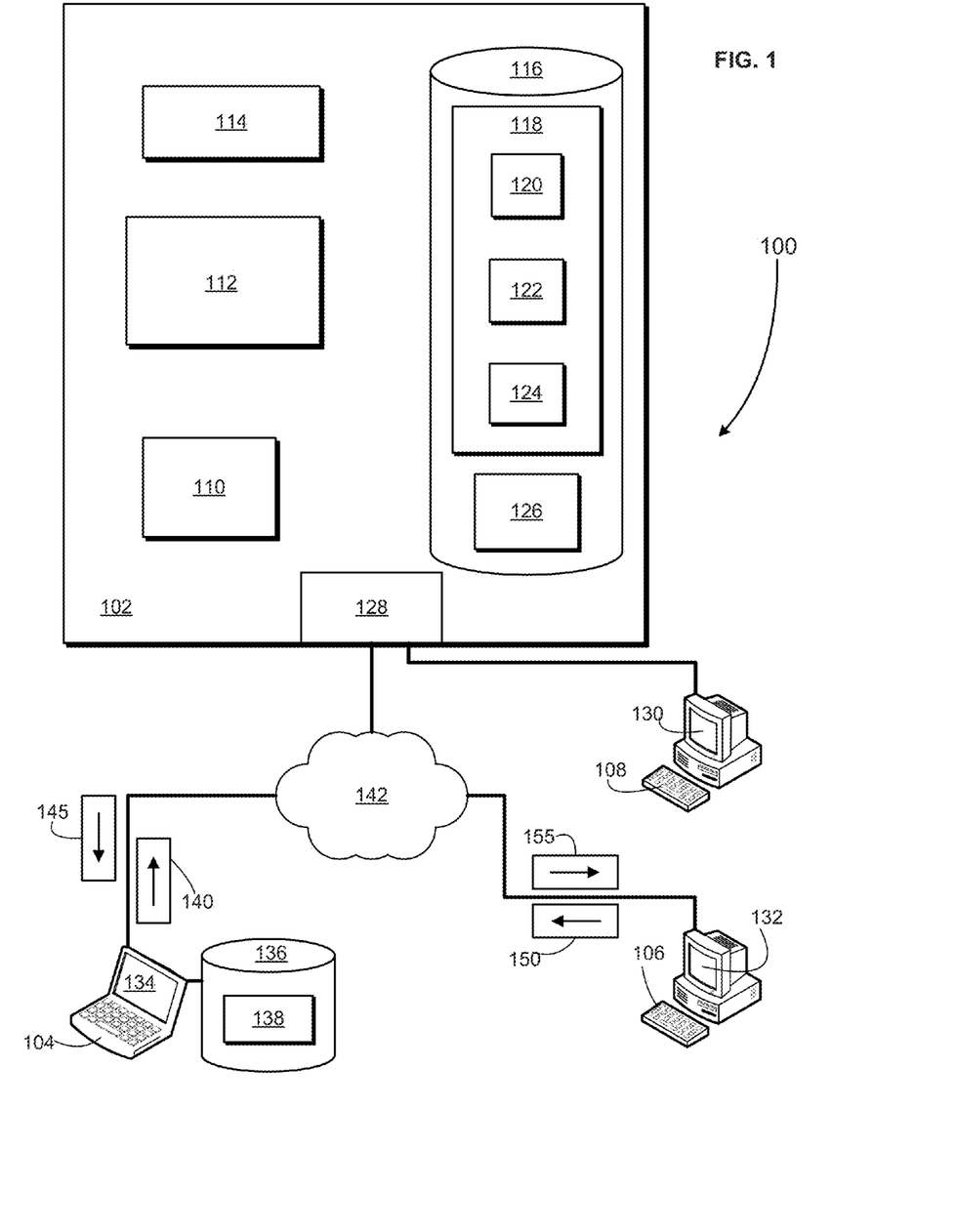
FIG. 1 is a schematic block diagram of an example system for conducting semantic searches of business entities.

FIG. 1 is a schematic block diagram 100 of an example system for conducting semantic searches of business entities. System 100 may include a server 102 and a client 104. The server 102 and client 104 communicate across a network 142.

Server 102 includes a processor 110. Processor 110 executes search requests from users of the network. A user of the network can be either an individual or a software application. Processor 110 can be, for example, a central processing unit (CPU), a blade, an application specific integrated circuit (ASIC), or a field-programmable gate array (FPGA), or other type of processors. Although FIG. 1 illustrates a single processor 110 in server 102, multiple processors may be used according to particular needs, and reference to processor 110 is meant to include multiple processors where applicable. In the illustrated implementation, processor 110 executes a semantic search engine 112 and a rendering engine 114.

Semantic search engine 112 processes a search request including search terms freely determined by a user. Freely defined search terms entered by a user can be check, and corrections/completions suggested or proposed from the business vocabulary. The semantic search engine 112 may make use of an ontology 118 in a memory 116, representing a knowledge base for the related business stored. The semantic search engine 112 may also use standard semantic search tools that are based on OWL modeled data for semantic information retrieval. The semantic search engine 112 may recognize the relevant business objects and elements and searches the entire ontology 118 by assigning content of the search terms to the assertion components of the ontology. In addition, the semantic search engine 112 may replicate historic search results for quick processing when the search terms are recognized to be the same as previous search terms.

Server 102 may include a memory 116 for storing the ontology 118 and search results 126. The ontology 118 may include classes 120, roles 122, and individuals. Individuals can be considered as instances, and roles can be considered as relations 124. Classes 120 describe business concepts in a specific domain. The classes 120 may be composed of instances or objects. Roles 122 describe aspects, properties, or parameters that classes can have. Relations 124 describe ways in which classes and objects can be related to one another. Search results 126 store search results that fulfill the requirements described in the search terms. In some instances, the search results 126 may store temporary, or incomplete, search results while a search is being performed, as well as completed result sets once the search is complete. In some instances, at least a portion of the completed search results may be persisted in case the same search terms or criteria are requested to be searched at a later time.

Memory 116 may include any memory or database module and may take the form of volatile or non-volatile memory including, without limitation, magnetic media, optical media, random access memory (RAM), read-only memory (ROM), removable media, or any other suitable local or remote and/or distributed memory and retrieved across a network, such as in a cloud-based computing environment.

Processor 110 may also execute a rendering engine 114 on the server 102. The rendering engine 114 renders a graphic presentation of the search results. For example, the rendering engine 114 may attach business icons to each of the returned search results and arrange the search results in a particular order that is preferred by the user. The rendering engine 114 may also organize the search results based on the relevancy of the search results. The search results that are more relevant to the user may be placed at the top of the list of search results. Additionally, the rendering engine 114 may keep track of user navigation history to enhance the browsing experience of the users throughout different networks.

Server 102 may be any computer or processing device such as a mainframe, a blade server, general-purpose personal computer (PC), Macintosh®, workstation, UNIX-based computer, or any other suitable device. Generally, FIG. 1 provides merely one example of computers that may be used with the disclosure. In other words, the present disclosure contemplates computers other than general purpose computers, as well as computers without conventional operating systems. The term "computer" is intended to encompass a personal computer, workstation, network computer, mobile computing device, or any other suitable processing device. For example, although FIG. 1 illustrates one server 102 that may be used with the disclosure, system 100 can be implemented using computers other than servers, as well as a server pool. Server 102 may be adapted to execute any operating system including z/OS, Linux-Intel® or Linux/390, UNIX, Windows Server®, or any other suitable operating system. According to one implementation, server 102 may also include or be communicably coupled with a web server and/or an SMTP server.

Server 102 may also include interface 128 for communicating with other computer systems, such as client 104, over network 142 in a client-server environment or any other type of distributed environments. In certain implementations, server 102 receives requests for data access from local or remote senders through interface 128 for storage in memory 116 and/or processing by processor 110. Generally, interface 128 comprises logic encoded in software and/or hardware in a suitable combination and operable to communicate with network 142. More specifically, interface 128 may comprise software supporting one or more communication protocols associated with communications network 142 or hardware operable to communicate physical signals.

Network 142 facilitates wireless or wireline communication between computer server 102 and any other local or remote computer, such as client 104. Network 142 may be all or a portion of an enterprise or secured network. In another example, network 142 may be a VPN merely between server 102 and client 104 across a wireline or wireless link. Such an example wireless link may be via 802.11a, 802.11b, 802.11g, 802.11n, 802.20, WiMax, and many others. The wireless link may also be via cellular technologies such as the 3rd Generation Partnership Project (3GPP) Global System for Mobile Communications (GSM), Universal Mobile Telecommunications System (UMTS), Long Term Evolution (LTE), etc. While illustrated as a single or continuous network, network 142 may be logically divided into various sub-nets or virtual networks without departing from the scope of this disclosure, so long as at least portion of network 142 may facilitate communications between senders and recipients of requests and results. In other words, network 142 encompasses any internal and/or external network, networks, sub-network, or combination thereof operable to facilitate communications between various computing components in system 100. Network 142 may communicate, for example, Internet Protocol (IP) packets, Frame Relay frames, Asynchronous Transfer Mode (ATM) cells, voice, video, data, and other suitable information between network addresses. Network 142 may include one or more local area networks (LANs), radio access networks (RANs), metropolitan area networks (MANs), wide area networks (WANs), all or a portion of the global computer network known as the Internet, and/or any other communication system or systems at one or more locations. In certain embodiments, network 142 may be a secure network associated with the enterprise and remote clients 104, 106 and 108.

System 100 allows for a client, such as client 104, to submit search requests to the server 102 and retrieve search results from the server 102. The client 104 may include a memory 136. Recent search results 138 may be stored in the memory 136. Client 104 may send a search request 140 to the server 102 via the network 142. Upon receiving the request 140, the server 102 may identify at least one relevant search result and deliver the identified search result 145 to the client 104. The system 100 may include other clients, such as 106, in addition to client 104. The client 106 may include a graphical user interface (GUI) 132 through which one or more interfaces with the rendering engine 114 may be presented to the client 106. Similar to the client 104, the client 106 may send a search request 150 to the server 102 via the network 142 and receive at least one identified search result 155 from the server 102.

In some implementations of system 100, a local user 108 may utilize or execute the semantic search engine 112 hosted on the server 102. As illustrated in FIG. 1, the local user 108 may be communicably coupled to the server 102. In other words, the local user 108 may be at the same location as the server 102, or alternatively, reside at a separate location but be in communication with the server 102. The local user 108 may include a GUI 130 through which one or more interfaces with the semantic search engine 112 may be presented to the local user 108.

It will be understood that there may be any number of clients 104 communicably coupled to server 102. This disclosure contemplates that many clients may use a computer or that one user may use multiple computers to submit or review queries via a graphical user interface (GUI) 134. As used in this disclosure, clients may operate remote devices, such as personal computers, touch screen terminals, workstations, network computers, kiosks, wireless data ports, wireless or wireline phones, personal data assistants (PDAs), one or more processors within these or other devices, or any other suitable processing device, to execute operations associated with business applications. For example, client 104 may be a PDA operable to wirelessly connect with an external or unsecured network. In another example, client 104 may comprise a laptop that includes an input device, such as a keypad, touch screen, mouse, or other device that can accept information, and an output device that conveys information associated with the operation of server 102 or client 104, including digital data, visual information, or GUI 134. Both the input device and output device may include fixed or removable storage media such as a magnetic computer disk, CD-ROM, or other suitable media to both receive input from and provide output to users of client 104 through the display, namely, over GUI 134.

GUI 134 includes a graphical user interface operable to allow the user of client 104 to interface with at least a portion of system 100 for any suitable purpose, including viewing, manipulating, editing, etc., graphic visualizations of user profile data. Generally, GUI 134 provides the user of client 104 with an efficient and user-friendly presentation of data provided by or communicated within system 100. GUI 134 may comprise a plurality of customizable frames or views having interactive fields, pull-down lists, and buttons operated by the user. In one implementation, GUI 134 presents information associated with queries and buttons and receives commands from the user of client 104 via one of the input devices. Moreover, it should be understood that the terms graphical user interface and GUI may be used in the singular or in the plural to describe one or more graphical user interfaces and each of the displays of a particular graphical user interface. Therefore, GUI 134 contemplates any graphical user interface, such as a generic web browser or touch screen, which processes information in system 100 and efficiently presents the results to the user. Server 102 can accept data from client 104 via the web browser (e.g., Microsoft® Internet Explorer or Mozilla® Firefox®) and return the appropriate HTML or XML responses using network 142. For example, server 102 may receive a search request from client 104 using a web browser or application-specific graphical user interface, and then may execute the request to search for business entities that fulfill certain criteria and provide the search results to the user interface.

Figure 2:
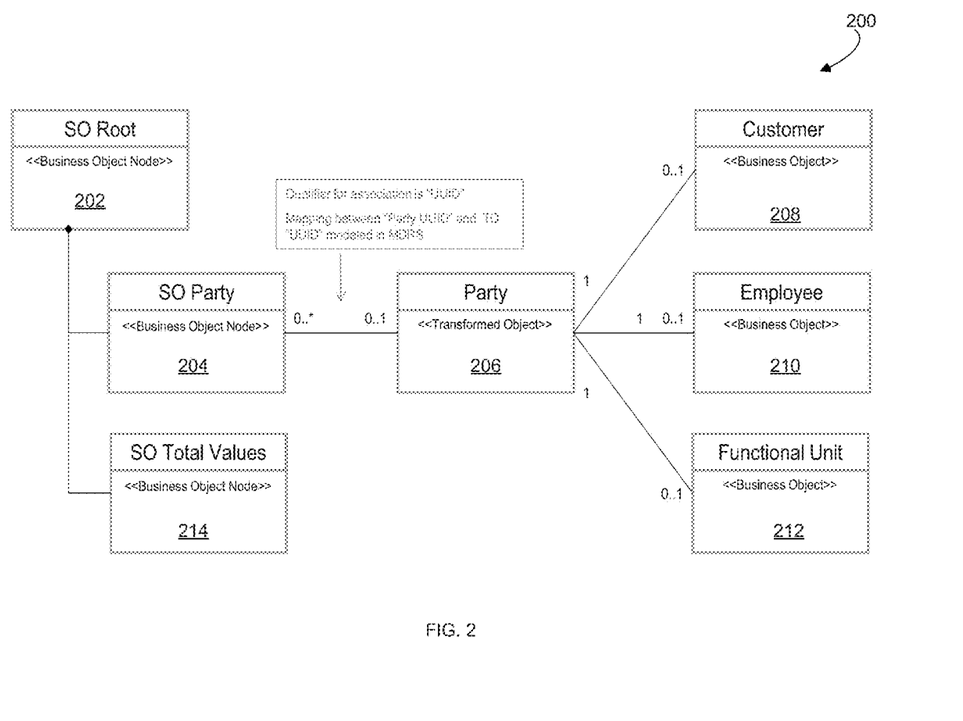
FIG. 2 is an example graph illustrating an object model of a class of sales order.

FIG. 2 is an example graph 200 illustrating an object model of a class of sales order. As shown in FIG. 2, the class of sales order (SO) includes various elements and associations. For example, the top level of the sales order class is represented in block 202. The class of sales order includes two sub-classes, i.e., sales orders party 204 and sales orders total values 214, and each can be represented as a business object node. The sub-class of sales order party 204 may be associated with zero or one transformed object 206. A qualifier and a universally unique identifier (UUID) may be used to map between the sales orders party 204 and the transformed object 206. A UUID is used as a key for mapping, e.g., a sales order party node (source key element is PartyUUID, term "Party" is the qualifier) to the transformed object party (target key element is UUID). In some implementations, the sales order party UUID may be mapped to the UUID modeled in the metadata repository service (MDRS). The transformed object 206 may include various types of business objects, such as customer 208, employee 210 and functional unit 212. In the illustrated example, for each type of business object, a maximum of one business object may be associated with the sub-class of party 206. For example, the number of customers would not exceed one for each sales order class. The illustrated example shown in FIG. 2 facilitates business objects and business object nodes (or changes thereto) that can be the basis for generating ontologies.

When a user submits a free search term that may include elements related to any of the business objects, sub-class, or class, all the classes and roles of the ontology would be checked for potential matches. The semantic search would allow the user to submit any search terms, for example, the search term may relate to sales orders, customer, employee, function unit, sales order total values or any other elements. Furthermore, the semantic search engine 112 (shown in FIG. 1) may recognize synonyms, homonyms, typos, or misspellings of the search terms, and intelligently refine the search based on the information. For example, a user may submit "total price of sales orders" as a search term, while the related business object is named as "sales orders total values" in the ontology. A typical keyword-based search would not find any element in the ontology that is related to the search term "total price of sales orders" and thereby return no valid search results. In comparison, the semantic search engine 112 would recognize that the search term "total price of sales orders" is equivalent to "sales orders total values" in the ontology and use the equivalent term "sales orders total values" for searches in the ontology. The keyword-based search may also find business entities in the ontology that are not relevant to the search term because of the conceptual differences, homonyms, and different contexts. On the other hand, there would not be such issues using the semantic search.

Figure 3:
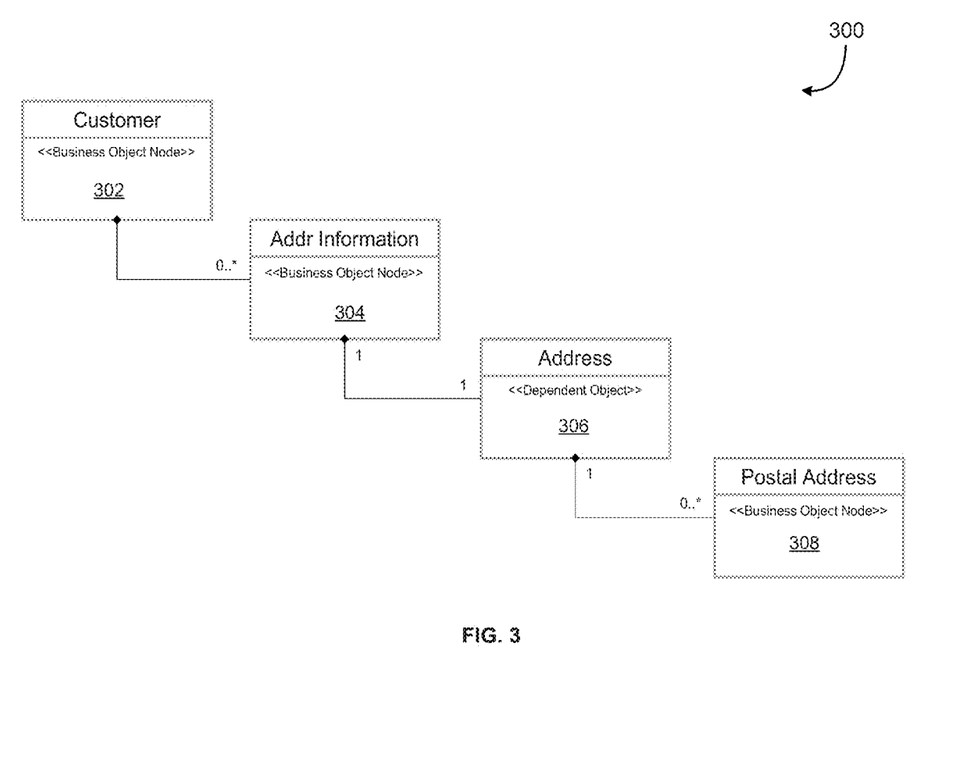
FIG. 3 is an example graph illustrating an object model of a class of customer.

FIG. 3 is an example graph 300 illustrating an object model of a class of customer. As shown in FIG. 3, the class of customer includes various elements and associations in a hierarchical structure. For example, the top level of the customer class is represented in block 302. The class of customer is associated with zero or more sub-class 304 of address information. The sub-class 304 of address information is further associated with an address object 306. The address object 306 is further associated with zero or more business object 308 of postal address. In some implementations, the MDRS model may be used to generate the ontology and the classes and relations in the ontology such as the customer class 302. The illustrated example shown in FIG. 3 facilitates business objects and business object nodes (or changes thereto) that can be the basis for generating ontologies.

When a user submits a free search term that may include elements related to any of the business objects, sub-class, or class, classes and roles of the entire ontology would be checked for potential matches. For example, a user may submit "customers in New York" as a search term. The semantic search engine 112 would then look up the address field in each customer database to check whether the address is matched to the search term. Standard OWL tools may be used for semantic information retrieval. For example, when the user submits "customers in New York" as the search terms, the semantic search engine 112 may search for business entities with customers having "New York" in their address field, and all the related subclasses and objects of the class of customer may be looked up as well. However, when the user submits "customers not in New York" as the search terms, the semantic search engine 112 would search for business entities with customers not having "New York" in their address field instead. The semantic search engine may assign different contents to the assertion component in the ontology to reflect the search constraint submitted by the user based on the search terms. The free search term may be any search term or search criteria the user comes up with, not limited to a list of pre-defined search criteria. In some implementations, the server may store frequently searched terms and associated search results in the memory 116 (shown in FIG. 1) such that the search results may be retrieved quickly when users submit similar search requests or search terms. The frequently searched terms and associated search results may be maintained and updated periodically to ensure that updated results would be returned to the user. In some implementations, a special layer may be used to provide the assertion component of the ontology for the purpose of conducting the semantic search. As an example, a database or SPAQL endpoint or other component that behaves like an assertion component can be used.

Figure 4:
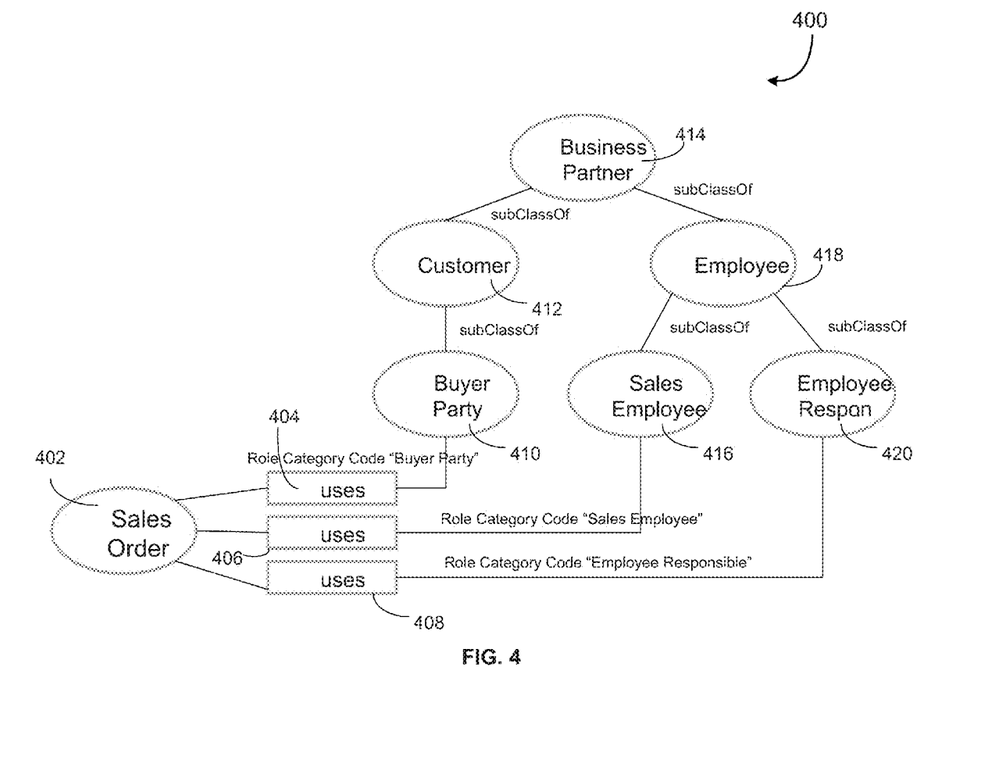
FIG. 4 is an example graph illustrating terminological components of a class of sales order in an ontology.

FIG. 4 is an example graph 400 illustrating terminological components of a class of sales order in an ontology. As shown in FIG. 4, the class of sales order 402 may be associated with various role categories 404-408, representing different roles associated with the sales order, i.e., buyer party, sales employee, and employee responsible. The role of buyer party 410 may be defined as a sub-class of customer 412, which in turn may be defined as a sub-class of business partner 414. The role of sales employee 416 may be defined as a sub-class of employee 418, which is a sub-class of business partner 414. Similar to the role of sales employee, the role of employee responsible 420 may also be defined as a sub-class of employee 418. The terminological presentation associates the class of sales order with different roles of the business and provides a convenient way to view different components of the ontology.

The terminological components of the ontology may also facilitate the semantic search for the business entities. For example, the user may search for business entities with sales orders from a particular buyer party, and then the semantic search engine 112 may quickly locate the buyer party role associated with sales orders and search for the particular buyer party in the buyer party role. Similarly, when the user submits search terms related to other roles such as sales employee or employee responsible, the semantic search engine 112 may look up the corresponding terminological components in the ontology for potential matches. The user may also submit search requests that are not directly related to one terminological component or role, for example, the search term may relate to elements or fields of multiple terminological components. The semantic search engine would search all the classes, roles, or terminological components in the entire ontology to find relevant search results. In some implementations, the terminological components of the ontology may be generated from the MDRS or other metadata databases.

Figure 5:
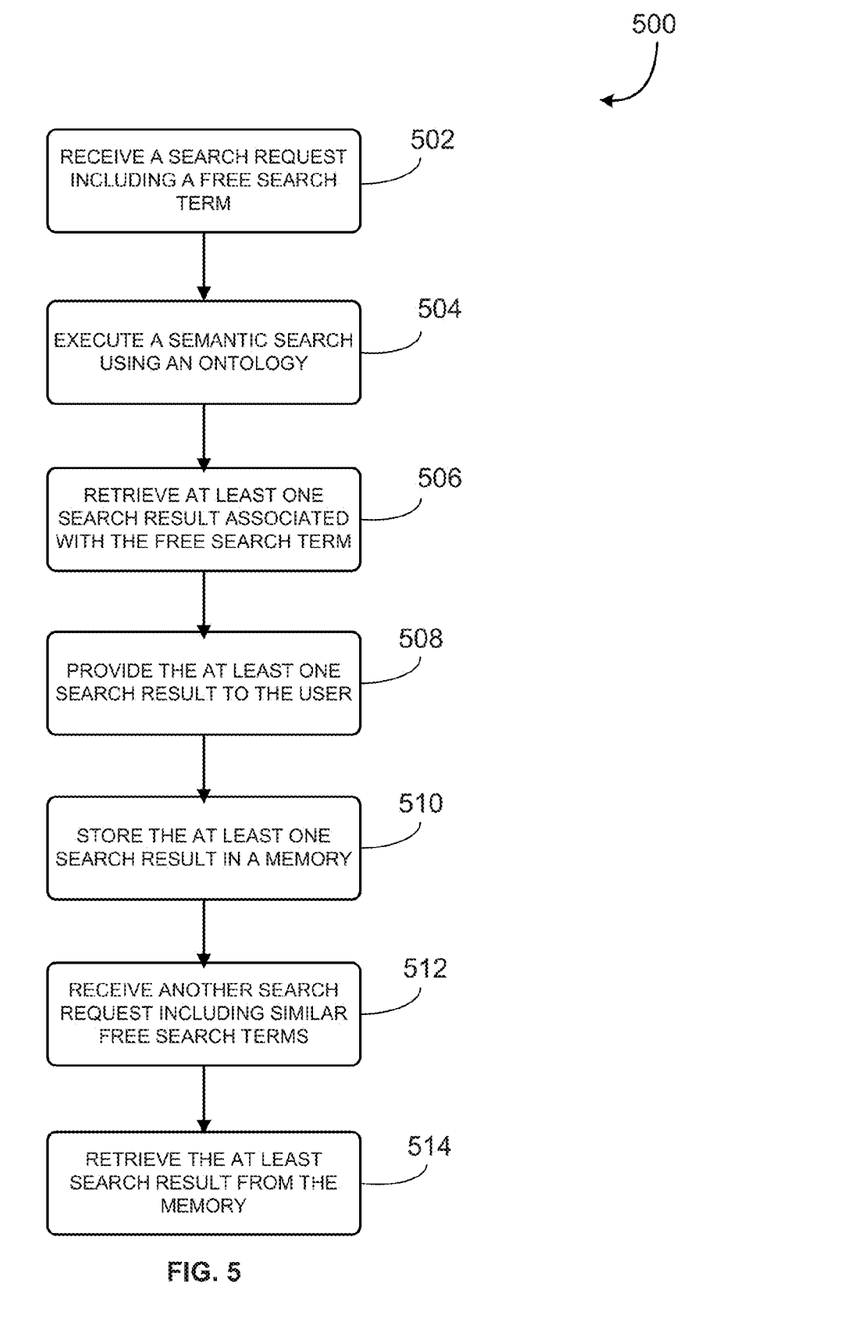
FIG. 5 is a process flow chart illustrating an example method for conducting a semantic search of business entities.

FIG. 5 is a process flow chart 500 illustrating an example method for conducting a semantic search of business entities. As shown in FIG. 5, the server may receive a search request from a user at 502. The received search request may include a free search term determined by the user. The free search term may be any term the user would like to use for the search and is not limited to any pre-defined search criteria. Each field or element of a business object may be used as a search criterion. The free search term may be determined by the user to find business entities or instances that meet certain constraints, such as locations, types of businesses, and net values of sales orders. The free search term may be a string of words, a sentence, some keywords, or any other form of text, including numbers, letters, symbols, etc. The free search term may also be used in combination with pre-defined search criteria to provide a refined search term. In some implementations, pre-defined search criteria may be provided to the user to help the user to determine the contents of the free search term. In some instances, a list of most frequently searched terms may be provided to the user as well to help the user to determine the search terms.

After receiving the free search term, the server may execute a semantic search using an ontology at 504. The ontology represents a knowledge base for the related business or industry. The ontology may include classes, roles, and individuals that describe elements or characteristics of the related business. In some implementations, the ontology may be generated from metadata of various business entities, such as the MDRS. The ontology may also be imported from ontology libraries or other open repository of ontologies. The server may search all classes and roles of the entire ontology for the free search term. In some implementations, standard tools based on OWL modeled data may be used for semantic information retrieval. Relevant business terms, constrains or criteria may be retrieved based on the free search term and used for the search in the ontology. Contents may be assigned to the assertion component of the ontology to retrieve data of business objects. The entire ontology may be looked up to find business entities or objects that meet the search criteria. In some implementations, a special layer may be used to provide the content of the assertion component such that the business entities or objects can be retrieved quickly.

The server may retrieve at least one search result associated with the free search term at 506. The search result may include a list of business entities or objects that fulfill the search criteria conveyed through the free search term. If no result can be found that fulfills the search criteria, the returned search result may include a description of failing to find relevant results. In this case, the server may also (or alternatively) retrieve search results that most closely match the search criteria, although those results do not fulfill all search criteria the user submits. The server may provide the search results to the user at 508. In some implementations, the server may provide a sorted list of search results, with the search results that best match the search criteria placed at the top of the list. In some implementations, the server may also provide a matching score associated with each search result such that the user may easily identify the relevancy of the returned search results. In the case that no search result completely fulfills the search criteria, the server may provide a list of search results that most closely match the search criteria to the user. Additionally, the server may provide suggestions to the user in terms of modifying the search terms such that valid search results can be found.

The server may store the search results and their associated search terms or criteria in a memory at 510. Subsequently, the server may receive another search request including similar free search terms at 512. Because this search request includes similar search criteria as in the prior search request, the server may retrieve the prior search results stored in the memory at 514, without conducting a real-time search in the ontology. The search results retrieved from prior search requests are replicated for search requests received at a later time instance with similar search criteria. Thus, search results may be provided to the user in a shorter period of time by avoiding a real-time search of the entire ontology. In some implementations, the server may store the frequently searched criteria and associated results in the memory to provide fast service for future search requests. The server may also keep updating the stored search results periodically to ensure the stored search results are current and accurate.

Figure 6:
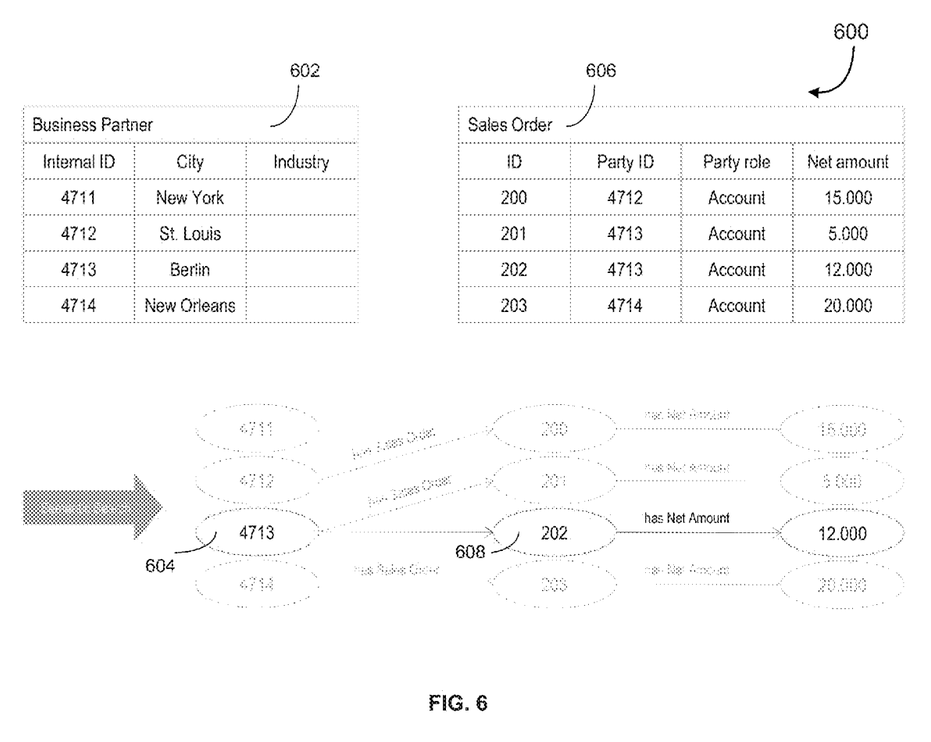
FIG. 6 is a graph illustrating an example of a semantic search for business entities.

FIG. 6 is a graph 600 illustrating an example of a semantic search for business entities. In this example, the user would like to search for all business partners that meet the following requirements: 1) business partners are located in Berlin; 2) business partners are the sales order accounts; and 3) total net value of the sales orders should exceed a value of 10,000 euro. Table 602 is a table presentation of the object of business partner, which includes two elements, i.e., internal identification (ID) and city. Each business partner is assigned a unique internal ID in the system, e.g., 4711, 4712, 4713, 4714, each ID representing a different business partner. The semantic search would utilize the address information listed in table 602 and identify that business partner 4713 is the sole business partner located in Berlin. The step of finding the business partners meeting the location criterion is illustrated at 604. Two remaining criteria need to be fulfilled, i.e., business partners are sales order accounts and total net value of the sales orders should exceed a value of 10,000 euro. Table 606 is a table presentation of the sales order object. As shown in table 606, the sales order object includes four elements: sales order ID, business party ID, business party role, and net amount. The semantic search would use the information associated with each sales order object to find business partners that meet the remaining criteria. Because it has already been identified that business partner 4713 is the only one meeting the location criterion, the semantic search would only need to check party ID 4713 in table 606, which leads to sales order ID 201 and 202. Both sales orders meet the second criterion, i.e., business partners are sales order accounts, as shown in table 606. However, sales order ID 201 has a sales value net amount of 5000 euro, which is less than the required 10,000 euro in the third criterion. Hence, sales order ID 201 does not meet the search criteria and is filtered out from the search results. On the other hand, sales order ID 202 has a sales value net amount of 12,000 euro, which fulfills the requirement of exceeding the value of 10,000 euro. Therefore, the semantic search would return sales order 202 as the search result that meets the search criteria at 608.

It can be seen in FIG. 6 that the semantic search searches each element and field of the associated objects in the ontology. The user may include any desired search term in the search request. The semantic search engine would refine the search terms by considering any related homonyms and synonyms, and conduct the search accordingly. Using the semantic search for finding target business entities gives the user a greater degree of freedom in selecting the search criteria, as well as improved accuracy and relevancy of the provided search results. Furthermore, certain optimization techniques may be employed with the semantic search to enhance the search speed, such as storing the frequently searched results for later retrieval, using a special layer to simulate the content of assertion components, etc.

A number of implementations of the disclosure have been described. Nevertheless, it will be understood that various modifications may be made without departing from the spirit and scope of the disclosure. Accordingly, other implementations are within the scope of the following claims.

What is claimed is:

1. A computer implemented method comprising:
   receiving a search request from a user, the search request including one or more free search terms about a business entity;
   revising the one or more free search terms to consider related terms to the one or more free search terms;
   executing a search using an ontology, wherein terminological components of the ontology are generated, at least in part, from metadata of business objects associated with the business entity, the search based on the revised one or more free search terms and semantically facilitated by the terminological components of the ontology associated with the business entity; and
   identifying at least one search result associated with the revised one or more free search terms;
   replicating the at least one search result for at least one search received at a later time instance, subsequent to storing the at least one search result; and
   providing the at least one search result associated with the revised one or more free search terms to the user.

2. The method of claim 1, wherein the one or more free search terms are freely determined by the user.

3. The method of claim 1, wherein the ontology includes classes, roles and individuals.

4. The method of claim 1, wherein the search searches all classes, roles, and individuals of the ontology.

5. The method of claim 1, further comprising storing the at least one search result associated with the revised one or more free search terms in a memory.

6. The method of claim 1, wherein the search is executed by one or more tools based on Web Ontology Language (OWL) modeled data for semantic information retrieval.

7. The method of claim 1, wherein retrieving the at least one search result associated with the revised one or more free search terms includes assigning content to an assertion component of the ontology.

8. A computer program product, tangibly embodied in a machine-readable non-transitory storage device, the computer program product configured to cause data processing apparatus to perform operations comprising:
   receiving a search request from a user, the search request including one or more free search terms about a business entity;
   revising the one or more free search terms to consider related terms to the one or more free search terms;
   executing a search using an ontology, wherein terminological components of the ontology are generated, at least in part, from metadata of business objects associated with the business entity, the search based on the revised one or more free search terms and semantically facilitated by the terminological components of the ontology associated with the business entity; and
   identifying at least one search result associated with the revised one or more free search terms;

replicating the at least one search result for at least one search received at a later time instance, subsequent to storing the at least one search result; and providing the at least one search result associated with the revised one or more free search terms to the user.

9. The product of claim 8, wherein the one or more free search terms are freely determined by the user.

10. The product of claim 8, wherein the ontology includes classes, roles and individuals.

11. The product of claim 8, wherein the search searches all classes, roles, and individuals of the ontology.

12. The product of claim 8, further comprising storing the at least one search result associated with the revised one or more free search terms in a memory.

13. The product of claim 8, wherein the search is executed by one or more tools based on Web Ontology Language (OWL) modeled data for semantic information retrieval.

14. The product of claim 8, wherein retrieving the at least one search result associated with the revised one or more free search terms includes assigning content to an assertion component of the ontology.

* * * * *